(12) United States Patent
Teshima et al.

(10) Patent No.: US 9,025,062 B2
(45) Date of Patent: *May 5, 2015

(54) SOLID-STATE IMAGING DEVICE AND CAMERA SYSTEM

(71) Applicant: Sony Corporation, Tokyo (JP)

(72) Inventors: Shimon Teshima, Kanagawa (JP); Kenichi Shigenami, Kanagawa (JP); Akihiko Miyanohara, Tokyo (JP); Shoji Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/282,495

(22) Filed: May 20, 2014

(65) Prior Publication Data

US 2014/0253770 A1    Sep. 11, 2014

Related U.S. Application Data

(63) Continuation of application No. 13/657,418, filed on Oct. 22, 2012, now Pat. No. 8,767,107.

(30) Foreign Application Priority Data

Oct. 27, 2011    (JP) .................................. 2011-236292

(51) Int. Cl.
*H04N 3/14*      (2006.01)
*H04N 5/361*    (2011.01)
*H04N 5/365*    (2011.01)
*H04N 5/369*    (2011.01)
*H04N 5/378*    (2011.01)

(52) U.S. Cl.
CPC ............... *H04N 5/361* (2013.01); *H04N 5/365* (2013.01); *H04N 5/3698* (2013.01); *H04N 5/378* (2013.01)

(58) Field of Classification Search
CPC ...... H04N 5/365; H04N 5/378; H04N 5/3698
USPC ........................................................ 348/300
See application file for complete search history.

(56) References Cited

U.S. PATENT DOCUMENTS

| 8,599,319 B2 | 12/2013 | Barry et al. |
| 8,767,107 B2 * | 7/2014 | Teshima et al. ................ 348/300 |
| 2006/0219862 A1 | 10/2006 | Ho et al. |
| 2006/0224040 A1 | 10/2006 | Khait et al. |

(Continued)

FOREIGN PATENT DOCUMENTS

JP    2011-159958    8/2011

*Primary Examiner* — James Hannett
(74) *Attorney, Agent, or Firm* — Fishman Stewart Yamaguchi PLLC

(57) ABSTRACT

A solid-state imaging device includes a pixel array unit having a plurality of pixels arranged in a matrix form which perform a photoelectric conversion, a pixel signal readout unit having a logic unit and performing a readout of a pixel signal from the pixel array unit, a regulator, a first circuit section, a second circuit section, and a stacked structure in which the first and second circuit sections are bonded, wherein the first circuit section has the pixel array unit disposed therein, and wherein the second circuit section has at least the logic unit and the regulator disposed therein, wherein the regulator includes a reference voltage generation, a plurality of output stage transistors, and an operational amplifier comparing the reference voltage and a commonized output voltage, and an output path of the output stage transistors are connected to a single node, and then is fed back to the operational amplifier.

16 Claims, 14 Drawing Sheets

(56) References Cited

U.S. PATENT DOCUMENTS

2010/0238336 A1 9/2010 Okamoto et al.
2012/0001615 A1 1/2012 Levine
2013/0235664 A1 9/2013 Tran et al.

* cited by examiner

SOLID-STATE IMAGING DEVICE AND CAMERA SYSTEM

CROSS REFERENCES TO RELATED APPLICATIONS

This is a Continuation application of U.S. patent application Ser. No. 13/657,418, filed Oct. 22, 2012, which claims priority from Japanese Priority Patent Application JP 2011-236292 filed in the Japan Patent Office on Oct. 27, 2011, the entire contents of which are hereby incorporated by reference.

BACKGROUND

The present technology relates to a solid-state imaging device represented as a CMOS (Complementary Metal Oxide Semiconductor) image sensor, and a camera system.

It is a main stream for the output circuit of a CCD (Charge Coupled Device) as a solid-state imaging device (image sensor) to be a one channel (ch) output using an FD amplifier having a floating diffusion layer (FD: Floating Diffusion).

Meanwhile, the CMOS image sensor is equipped with an FD amplifier for every pixel, and a column-parallel output type in which a single row line out of a pixel array is selected and these are read out at the same time in the column direction is mainstream as the output thereof.

It may be difficult to obtain a sufficient driving ability in the FD amplifier disposed in the pixel, accordingly, it may be necessary to lower a data rate because a parallel processing is advantageous.

In this way, the CMOS image sensor has been widely used as an imaging device in an imaging apparatus such as digital cameras, camcorders, surveillance cameras or in-vehicle cameras.

FIG. 1 is a diagram illustrating an example of general configuration of a CMOS image sensor in which pixels are disposed in the form of a two dimensional array.

The CMOS image sensor 10 in FIG. 1 is configured by a pixel array unit 11, a row selection circuit 12, and a readout circuit (column processing circuit: AFE) 13.

With respect to the pixel array unit 11, pixel circuits are disposed in a matrix form of M rows×N columns.

The row selection circuit 12 controls the operation of the pixels disposed in an arbitrary row out of the pixel array unit 11. The row selection circuit 12 controls the pixel through control lines LSEL, LRST, and LTRG.

The readout circuit 13 receives pixel data of a row line which has been readout-controlled by the row selection circuit 12 through a signal output line LSGN, and then the data is transferred to a subsequent stage signal processing circuit.

The readout circuit 13 includes a correlated double sampling (CDS) circuit or analog digital converter (ADC).

FIG. 2 is a diagram illustrating an example of a pixel circuit of CMOS image sensor which is configured of four transistors.

A pixel circuit 20 includes, for example, a photoelectric conversion element 21 (hereinafter, sometimes simply referred to as PD) formed of a photo-diode (PD). With respect to this one photoelectric conversion element 21, the pixel circuit 20 has four transistors as active elements such as a transfer transistor 22, a reset transistor 23, amplification transistor 24, and a selection transistor 25.

The photoelectric conversion element 21 performs a photoelectric conversion of an incident light into an amount of charge (in this case, electrons) corresponding to an amount of light thereof.

The transfer transistor 22 is connected between the photoelectric conversion element 21 and the floating diffusion FD (hereinafter, sometimes simply referred to as FD), and a transfer signal (driving signal) TRG is provided to a gate of the transfer transistor 22 through a transfer control line LTRG.

In this way, electrons which are photoelectrically converted by the photoelectric conversion element 21 are transferred to the floating diffusion FD.

The reset transistor 23 is connected between a power line LVDD and the floating diffusion FD, and a reset signal RST is provided to a gate of the reset transistor 23 through the reset control line LRST.

In this way, a potential of the floating diffusion FD is reset to the potential of the power line LVDD.

In the floating diffusion FD, a gate of amplification transistors 24 is connected. The amplification transistor 24 is connected to a signal line 26 (LSGN in FIG. 1) through the selection transistor 25, and configures a source follower with a constant current outside the pixel unit.

Then, an address signal (selection signal) SEL is provided to a gate of the selection transistor 25 through the selection control line LSEL, and then the selection transistor 25 is turned on.

When the selection transistor 25 is turned on, the amplification transistor 24 amplifies a potential of the floating diffusion FD and then outputs a voltage corresponding to the potential thereof to the signal line 26. A voltage output from each pixel through the signal line 26 is output to the readout circuit.

As the pixel reset operation, a charge accumulated in the photoelectric conversion element 21 is transferred to the floating diffusion FD, and is expelled by turning on the transfer transistor 22.

At this time, the floating diffusion FD turns on the reset transistor 22 and expells the charge to the power source side in advance in order to receive the charge of the photoelectric conversion element 21. Alternatively, while the transfer transistor 22 is turned on, there are cases where the reset transistor 23 is turned on in parallel with the transfer transistor 22 being turned on, accordingly the charge is expelled directly to the power source.

This series of operations is simplified and is called "a pixel reset operation" or "a shutter operation".

On the other hand, in a readout operation, the floating diffusion FD is reset by first turning on the reset transistor 23, and in such a situation, the output thereof is output to the output signal line 26 through the selection transistor 25 which has been turned on. This is referred to as P-phase output.

Next, the charge accumulated in the photoelectric conversion element 21 is transferred to the floating diffusion FD by turning on the transfer transistor 22, the output thereof is output to the output signal line 26. This is referred to as D-phase output.

Taking the difference between the P-phase and the D-phase outside the pixel circuit, a reset noise of the floating diffusion FD is canceled to become an image signal.

By simplifying this series of operations, they are simply called "a pixel readout operation".

The control lines such as the transfer control line LTRG, the reset control line LRST, and the selection control line LSEL are selectively driven by the row selection circuit 12.

As a configuration of the pixel circuit, in addition to a four transistor configuration (4Tr-type), configurations such as a three transistor (3Tr-type) and a five transistor (5Tr-type) may be adopted.

The 3Tr-type pixel circuit is not provided with the transfer transistor which controls the movement of charge toward the floating diffusion FD from the photoelectric conversion element (PD) 21 according to the potential of the transfer control line LTRG.

Meanwhile, in the semiconductor apparatus having a structure which a plurality of sensors are disposed in an array-type such as the CMOS image sensor, a demand for sophistication and miniaturization of the signal processing has been increasing.

To achieve this, by making a chip with a stacked structure as in, for example, Japanese Unexamined Patent Application Publication No. 2011-159958, a technique has been proposed to integrate a bigger signal processing circuit in the same chip size as until now.

Such a semiconductor apparatus includes a chip mounted with a sensor array that generates an analog signal (hereinafter, referred to as an analog chip), a chip mounted with a logic circuit for signal processing (hereinafter, referred to as digital chip). Further, the semiconductor apparatus, which is a structure connected with a TC(S)V (Through Contact(Silicon) VIA) formed in the analog chip, has been miniaturized by stacking these chips up and down.

SUMMARY

Meanwhile, in general, the power for the logic of image sensor is supplied from outside. Therefore, a response to a customer who is not capable of being supplied with an external power voltage for logic has not yet been performed.

As this response, mounting an internal regulator such as an LDO (Low Drop Out) in the image sensor chip is being considered.

However, by mounting the internal regulator within the chip, a heat gradient problem in the plane of the chip may occur.

In a case where the internal regulator is mounted on the image sensor having the stacked structure in which an upper and a lower chips are bonded, it can be said that this is a particular problem because a heat source is generated directly below the pixel.

Further, disposing plural regulators may also be considered, however, because the error amplifier feeds back to the same node, there is a possibility of an unintended operation occurring.

It is desirable to provide a solid-state imaging device and a camera system which is able to alleviate not only a heat gradient in a chip but also dark shading.

According to an embodiment of the present technology, there is a solid-state imaging device including a pixel array unit having a plurality of pixels arranged in a matrix form which perform photoelectric conversion, a pixel signal readout unit having a logic unit and performing a readout of a pixel signal from the pixel array unit, a regulator supplying a driving voltage to the logic unit, a first chip, a second chip, and a stacked structure in which both the first chip and the second chip are bonded, wherein the first chip has the pixel array disposed therein, wherein the second chip has at least the logic unit and the regulator disposed therein, wherein the regulator includes a reference voltage generation unit generating a reference voltage, a plurality of output stage transistors, an operational amplifier comparing the reference voltage with a commonized output voltage of the plurality of output stage transistors, wherein an output of operational amplifier is connected to a gate of the plurality of output stage transistors, and an output path of the output stage transistors are connected to a single node, and is fed back to the operational amplifier, wherein a power source side terminal of the plurality of the output transistors is connected respectively to the power supply terminal to be supplied with an external power voltage, and wherein the operational amplifier controls the gate voltage of the plurality of output stage transistors by comparing the reference voltage with the commonized output voltage at the node of the plurality of output stage transistors.

According to another embodiment of the present technology, there is a camera system including a solid-state imaging device, an optical system imaging an image of a subject to the solid-state imaging device, wherein the solid-state imaging device includes a pixel array unit having a plurality of pixels arranged in a matrix form which perform a photoelectric conversion, a pixel signal readout unit having a logic unit and performing a readout of a pixel signal from the pixel array unit, a regulator supplying a driving voltage to the logic unit, a first chip, a second chip, and a stacked structure in which both the first chip and the second chip are bonded, wherein the first chip has the pixel array disposed therein, wherein the second chip has at least the logic unit and the regulator disposed therein, wherein the regulator includes a reference voltage generation unit generating a reference voltage, a plurality of output stage transistors, an operational amplifier comparing the reference voltage and a commonized output voltage of the plurality of output stage transistors, wherein an output of operational amplifier is connected to a gate of the plurality of output stage transistors, wherein output paths of the output stage transistors are connected to a single node and fed back to the operational amplifier, wherein power source side terminals of the plurality of the output transistors are connected respectively to power supply terminals to be supplied with the external power voltage, and wherein the operational amplifier controls the gate voltage of the plurality of output stage transistors by comparing the reference voltage and the commonized output voltage at the node of the plurality of output stage transistors.

According to the present technology, it may be possible to alleviate not only a heat gradient in a chip but also dark shading.

DETAILED DESCRIPTION OF EMBODIMENTS

Hereinafter, an embodiment of the present technology is described with reference to the drawings.

Figure 1:
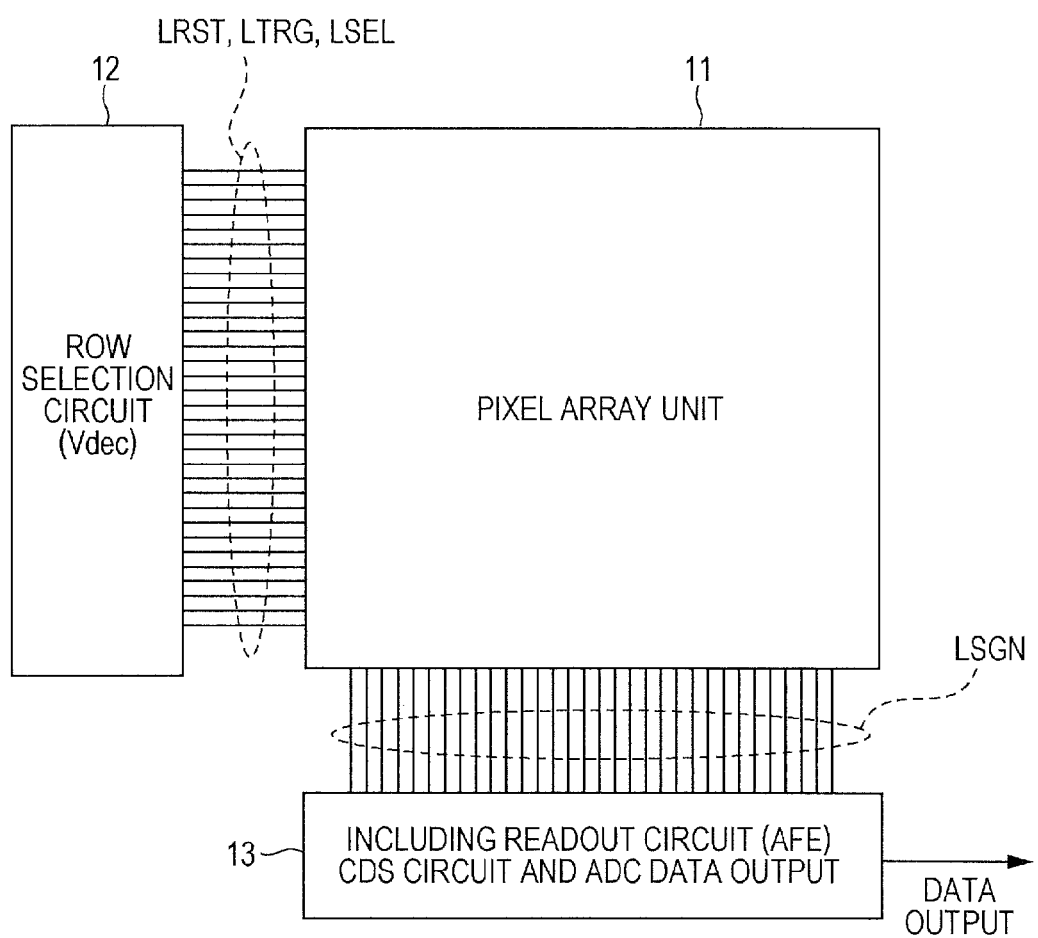
FIG. 1 is a diagram illustrating an example of general configuration of a CMOS image sensor (solid-state imaging device) in which pixels are disposed in the form of a two dimensional array.
Figure 2:
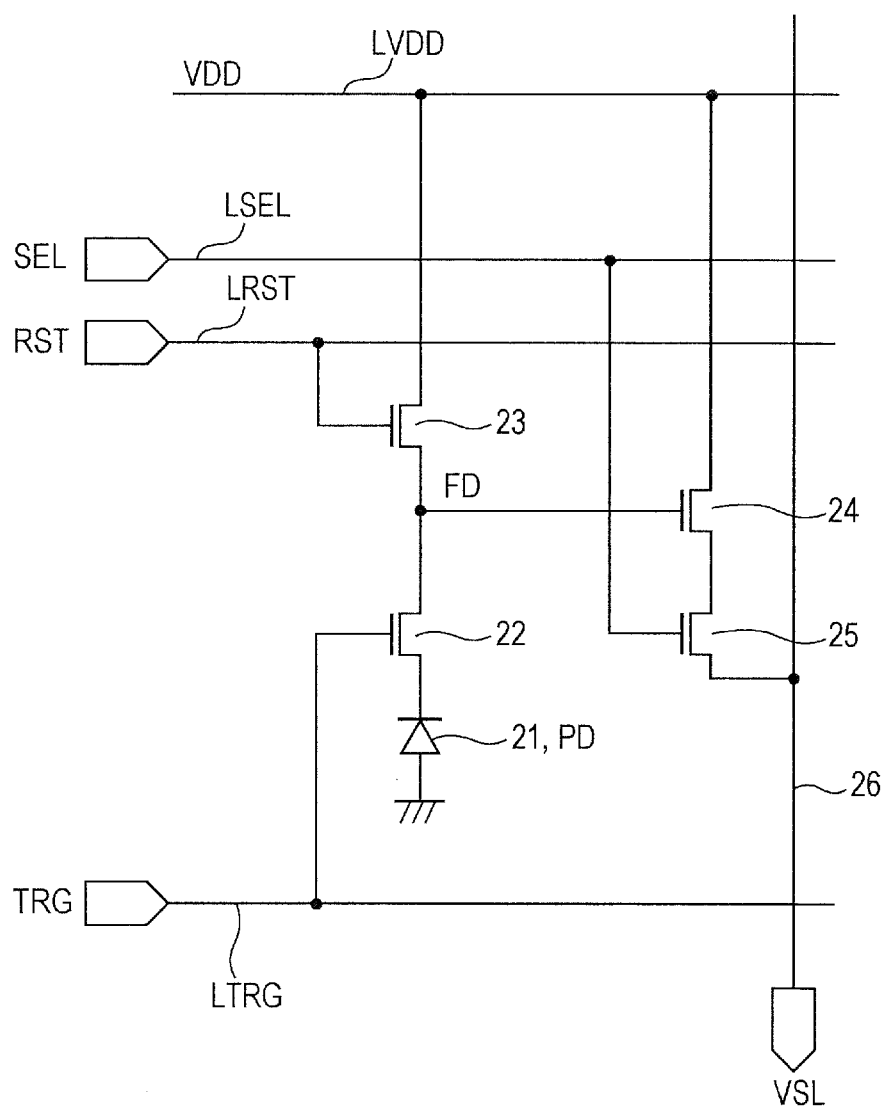
FIG. 2 is a diagram illustrating an example of a pixel circuit of CMOS image sensor which is configured of four transistors.
Figure 3:
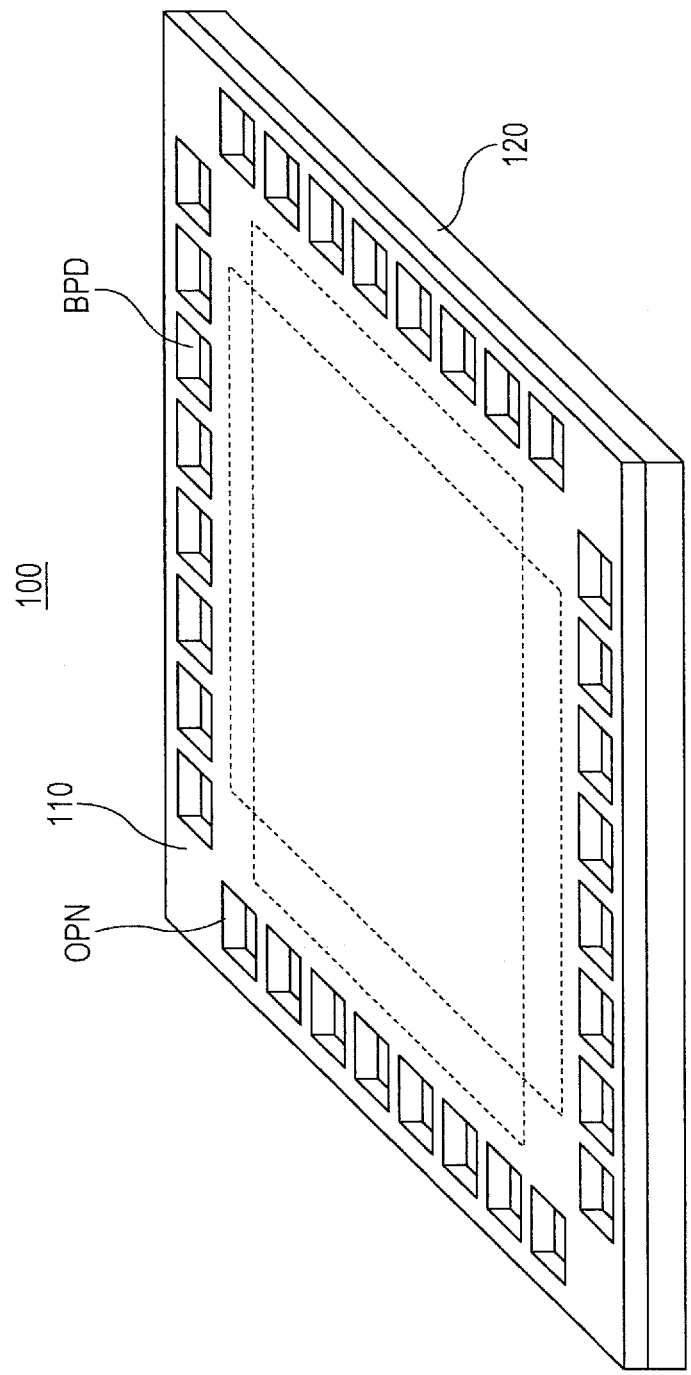
FIG. 3 is a diagram illustrating an example of a laminated structure of a solid-state imaging device according to an embodiment of the present technology.

Further, the description will be provided in the following order.
1. Stacked structure of solid-state imaging device
2. Configuration of regulator and disposed example thereof in chip
3. Summary of solid-state imaging device
4. Configuration example of camera system 1. Stacked Structure of Solid-State Imaging Device FIG. 3 is a diagram illustrating an example of the stacked structure of the solid-state imaging device according to an embodiment of the present technology. The solid-state imaging device 100 of the embodiment in the present technology includes a plurality of pixels (sensors) having a photoelectric conversion element or the like which is disposed in a form of array.

The solid-state imaging device 100 includes, as illustrated in FIG. 3, a first chip (an upper chip) 110 and a second chip (a lower chip) 120.

The first chip 110 and the second chip 120 which have been stacked are electrically connected to each other by the VIA (TCV) formed in the first chip 110.

This solid-state imaging device 100 is formed to be a semiconductor apparatus with the stacked structure cut out in dicing after being laminated at the wafer level.

With respect to the stacked structure of two chips of an upper and a lower, the first chip 110 is configured of an analog chip (a sensor chip) with a pixel array unit having a plurality of pixels in the form of array disposed therein.

The second chip 120 is configured of a circuit which quantizes an analog signal transferred through TCV from the first chip 110 and a logic chip (a digital chip) having a signal processing circuit (a logic circuit). A bonding pad BPD and an input output circuit are formed in the second chip 120, and an opening unit OPN for performing wire bonding into the second chip 120 is formed in the first chip 110.

An electrical connection between the first chip 110 and the second chip 120, for example, is performed by the VIA (TCV).

The disposed location of TCV (VIA) is an edge of chip, or between a PAD and a circuit region.

For example, the control signal and the TCV for power supply mainly focus on four corners of each chip unit, accordingly, it may be possible to reduce a signal wiring region of the first chip 110.

Due to reduction in the number of wiring layers of the first chip 110, the resistance of power line increases, and with respect to problem whereby IR-Drop increases, by effectively disposing TCV, a noise countermeasures for the power supply of the first chip 110 and a reinforcement for stable supply and the like using the wiring of the second chip 120 may be performed.

Further, the solid-state imaging device 100 having the stacked structure of two chips according to the embodiment of the present technology includes the following characteristic configuration.

Figure 4:
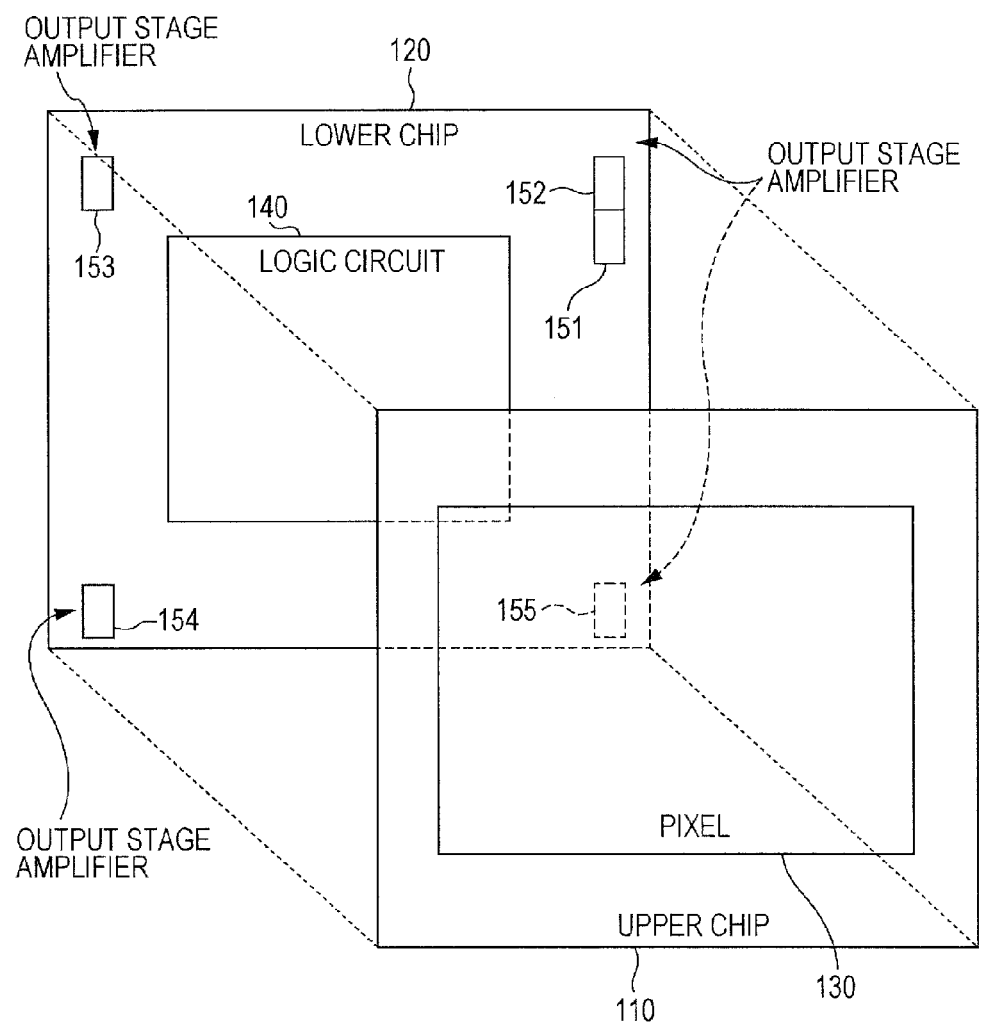
FIG. 4 is a diagram for describing a characteristic configuration of a solid-state imaging device having a laminated structure of two chips according to an embodiment of the present technology.

FIG. 4 is a diagram illustrating the characteristic configuration of the solid-state imaging device having the stacked-structure of two chips according to the embodiment of the present technology.

As illustrated in FIG. 4, in the solid-state imaging device 100, a pixel array unit 130 is disposed in the first chip 100 which is the analog chip. In the solid-state imaging device 100, an logic circuit 140 and an internal regulator 150 formed of LDO which is an internal power source of logic circuit are disposed in the second chip 120 which is the digital chip.

In this way, the solid-state imaging device 100 according to the embodiment of the present technology may respond to a customer who is not supplied with an external power for logic by mounting the internal regulator (LDO) in the second chip 120.

The internal regulator 150 alleviates an electric field generated at a transistor of the logic circuit 140 and suppresses (relieves) a characteristic deterioration by lowering the voltage of power supplied to the logic circuit 140 using the LDO.

Further, the LDO is a linear voltage regulator which operates even when an input voltage is slightly greater than a desired voltage.

However, the heat gradient may cause a problem in a plane of the chip due to mounting the regulator (LDO) inside the chip. At this point, in a case where the internal regulator is mounted on the solid-state imaging device 100 having the stacked structure bonded to each other by the upper-chip and the lower-chip, a heat source is generated directly below the pixel, and there is concern of an influence on the first chip side.

Therefore, as illustrated in FIG. 4, the regulator (LDO) 150 here adopts a configuration with one error amplifier 151 and only an output stage dispersed into a plurality of output stage amplifiers (output stage transistors) 152 to 155.

The reason for this is that the heat gradient in a plane of the second chip 120 may be alleviated by dispersing (dividing) the output stage into corners inside the chip (four corners in the example of FIG. 4) and disposing therein.

As an effect thereof, it may be possible to alleviate dark shading which occurs due to the heat gradient in the plane of the chip.

Further, because there is one error amplifier 151, there is also one feedback point, and the configuration is more stable than that with a plurality of amplifiers.

2. Configuration of Regulator and Disposed Example Thereof in Chip

Figure 5:
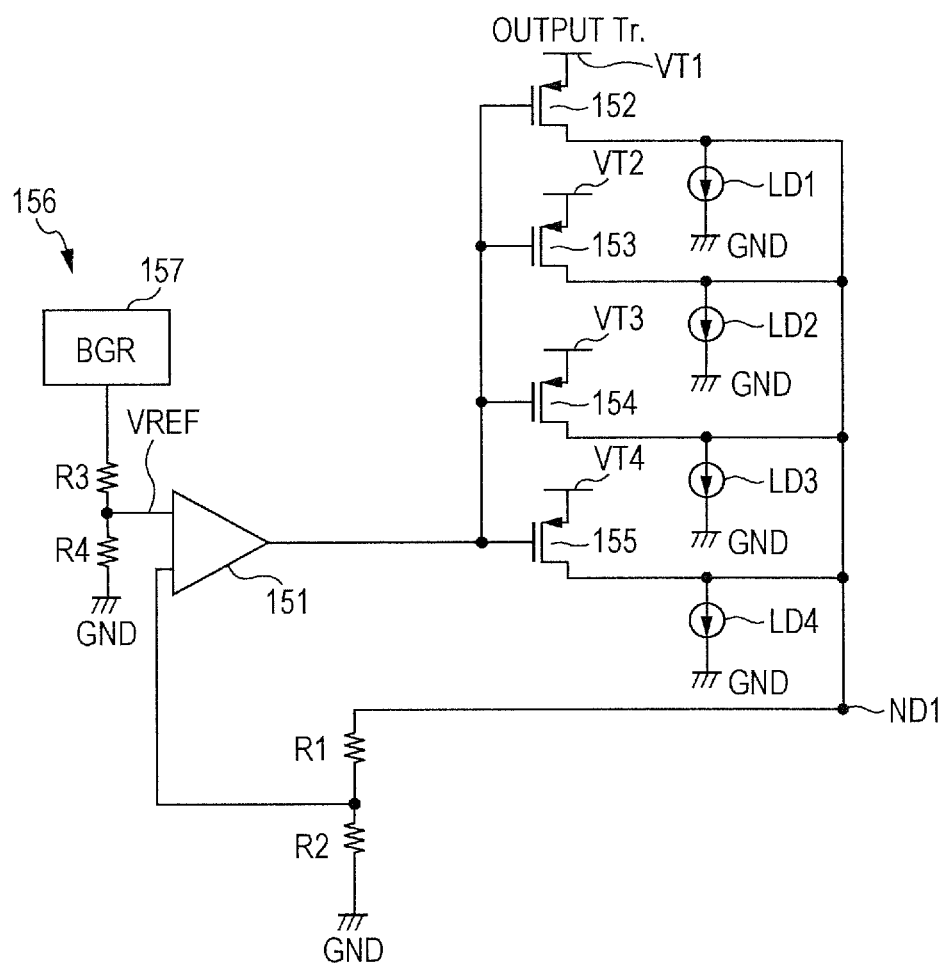
FIG. 5 is a circuit diagram illustrating an example of basic configuration of an internal regulator according to an embodiment of the present technology.

FIG. 5 is a circuit diagram illustrating an example of basic configuration of an internal regulator according to the embodiment of the present technology.

Figure 6:
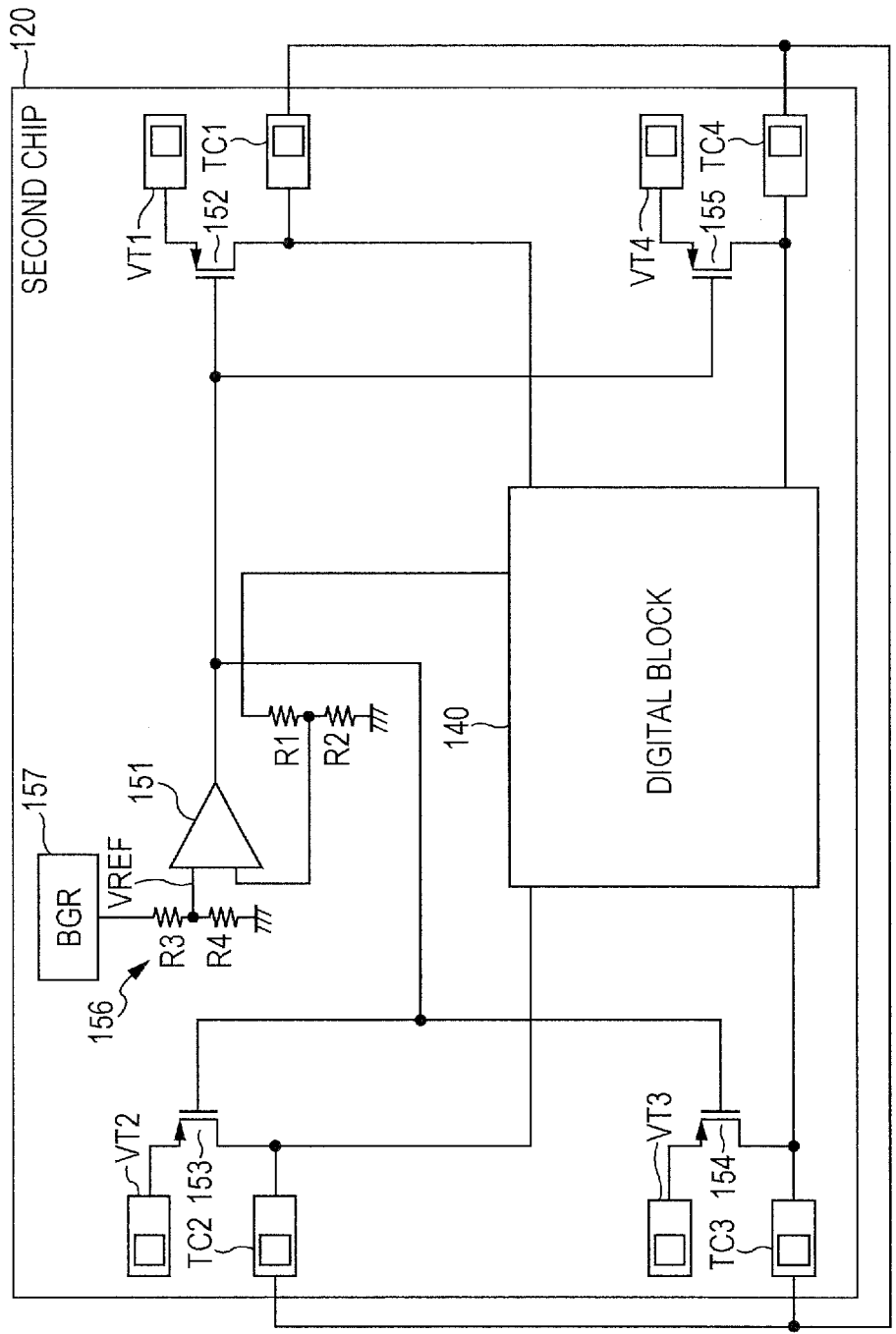
FIG. 6 is a diagram illustrating an example which the regulator in FIG. 5 is mounted on a second chip.

FIG. 6 is a diagram illustrating an example where the regulator in FIG. 5 has been mounted in the second chip.

Figure 7:
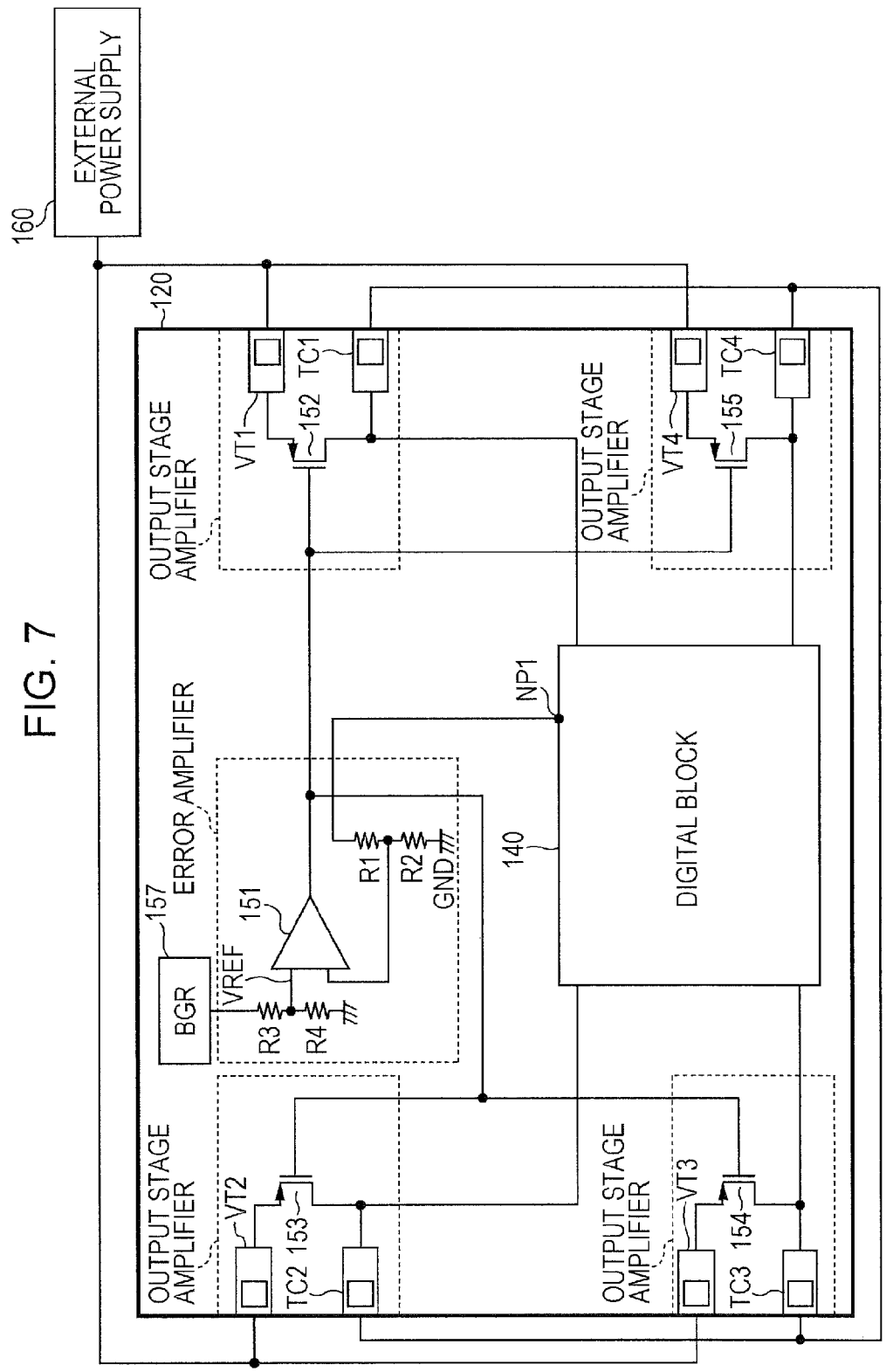
FIG. 7 is a diagram illustrating an example which an output stage amplifier is connected to an external power supply in the regulator configuration in FIG. 6.

FIG. 7 is a diagram illustrating an example where output stage amplifiers are connected to external power supply in the configuration of the regulator in FIG. 6.

The regulator 150 in FIG. 5 includes an operational amplifier (error amplifier) 151, a plurality of PMOS transistors for output (field effect transistor) 152 to 155, a reference voltage generation circuit 156, and voltage divisional resistors for feedback R1 and R2.

Further, a LD1 to LD4 in FIG. 5 illustrates a load on the voltage supply line.

The reference voltage generation circuit 156 is configured by including a band gap (BGR) circuit 157 and a resistor for the reference voltage generation R3 and R4.

In the reference voltage generation circuit 156, the resistors R3 and R4 which are serially connected to each other receive a current from the band gap (BGR) circuit 157 in the second chip 120, generate a reference voltage VREF, and then supply a one way input terminal of the error amplifier 151 with the VREF.

The other input terminal of the error amplifier 151 is connected to a connection point of the voltage divisional resistors R1 and R2 which are serially connected to each other.

An output terminal of the error amplifier 151 is connected to each gate of the plurality of output stage transistors 152 to 155.

The source of the output stage transistor 152, for example, is connected to a power supply terminal VT1 of 1.8 V power voltage which is supplied from outside, and a drain thereof is connected to a load LD1 in the logic circuit 140 and a connection terminal TC1 formed in the second chip 120.

A source of the output stage amplifier 153, for example, is connected to a power supply terminal VT2 of 1.8 V power voltage which is supplied from outside, and a drain thereof is connected to a load LD2 in the logic circuit 140 and a connection terminal TC2 formed in the second chip 120.

A source of the output stage transistor 154, for example, is connected to a power supply voltage VT3 of the 1.8 V power voltage which is supplied from outside, and a drain thereof is connected to a load LD3 in the logic circuit 140 and a connection terminal TC3 formed in the second chip 120.

A source of the output stage transistor 155, for example, is connected to a power supply voltage VT4 of the 1.8 V power voltage which is supplied from outside, and a drain thereof is connected to a load LD4 in the logic circuit 140 and a connection terminal TC4 formed in the second chip 120.

An output of output stage transistors 152 to 155 is connected to one node ND1 after driving the load LD1 to LD4, and is commonly connected to one end of the voltage divisional resistor R1. In this way, the output of the output stage transistors 152 to 155 is averaged and fed back to the error amplifier 151 through the voltage divisional resistor.

Further, the power supply terminals VT1 to VT4 of power voltage to which the source of the output stage transistors 152 to 155 of each output stage amplifiers are connected to, for example, as illustrated in FIG. 7, is connected an external power supply 160.

Further, according to the embodiment of the present technology, as illustrated in FIG. 6 and FIG. 7, divided sense lines (drain side line of the output stage transistors) of the output stage amplifier are disposed to be connected through the connection terminals TC1 to TC4 via a substrate 170 outside the second chip 120.

In this way, a low resistance value due to a substrate connection may be fed back.

This regulator 150 controls a gate voltage of the output stage transistors 152 to 155 from the output stage by the error amplifier 151 to which the reference voltage VREF is input.

The regulator 150 feeds back because a midpoint of the voltage divisional resistors R1 and R2 which are commonly connected to the output of each output stage transistor 152 to 155 is input to the error amplifier 151, and generates a desired constant voltage.

Further, the regulator 150 according to the embodiment of the present technology includes a standby function (standby mode) and a forced standby function (forced standby mode).

Figure 8:
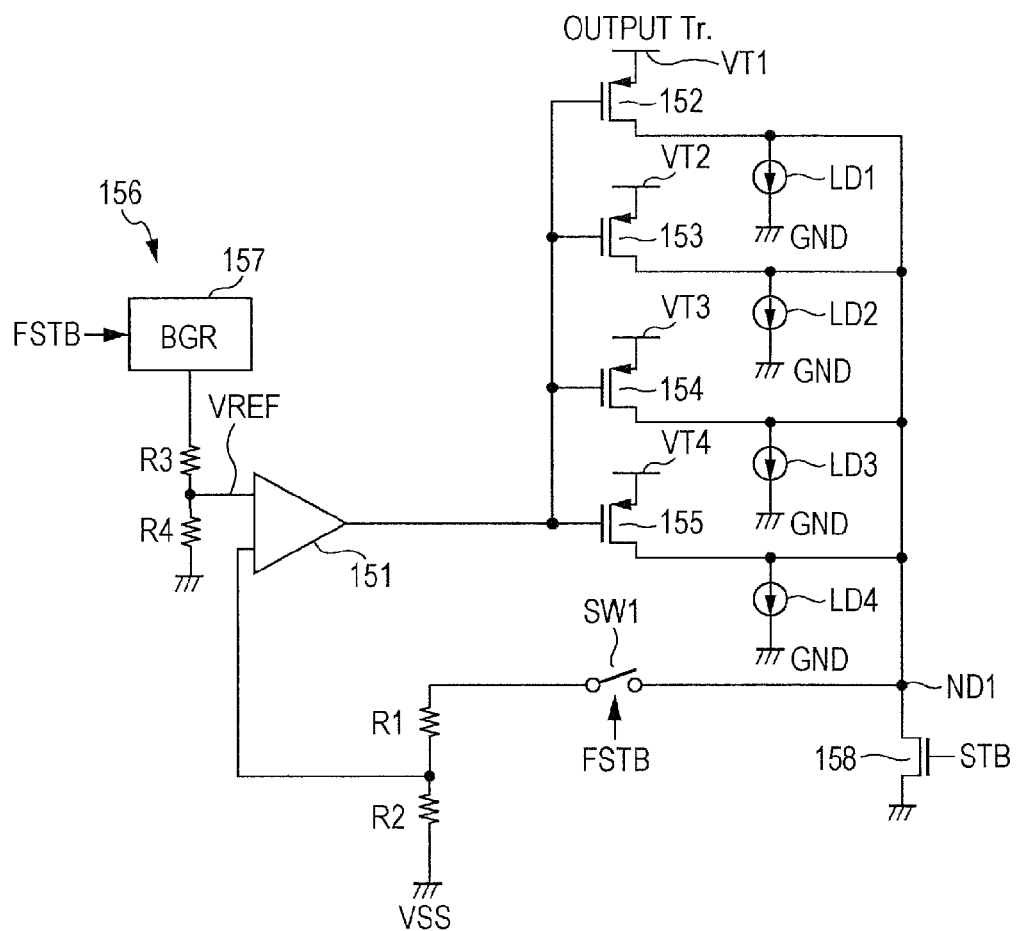
FIG. 8 is a diagram for describing a standby function (standby mode) and a forced standby function (forced standby mode) in a regulator according to an embodiment of the present technology.

FIG. 8 is a diagram for describing the standby function (standby mode) and the forced standby function (forced standby mode) with respect to a regulator according to the embodiment of the present technology.

The standby mode sets a regulator 150A to a standby state by a standby control signal STB, and sets an output of regulator 150A, for example, as illustrated in FIG. 8, to a fixed potential by a pull-down transistor 158, for example, a GND level.

The standby mode turns off all the internal transistors, and cuts a reference current from BGR 157 by excluding the pull-down transistor 158 of the GND level by the standby control signal STB. At this time, the output of regulator 150 is set to be a GND level.

The forced standby mode turns off a function of regulator 150A by the forced standby control signal FSTB, and may supply the regulator 150A with a voltage for logic power source from outside.

The forced standby mode sets the regulator 150A to the standby state by the forced standby control signal FSTB, for example, as illustrated in FIG. 8, and sets an output node ND1 to high impedance Hiz by turning off a switch SW1.

At this time, the forced standby control is superior to the standby control.

Figure 9:
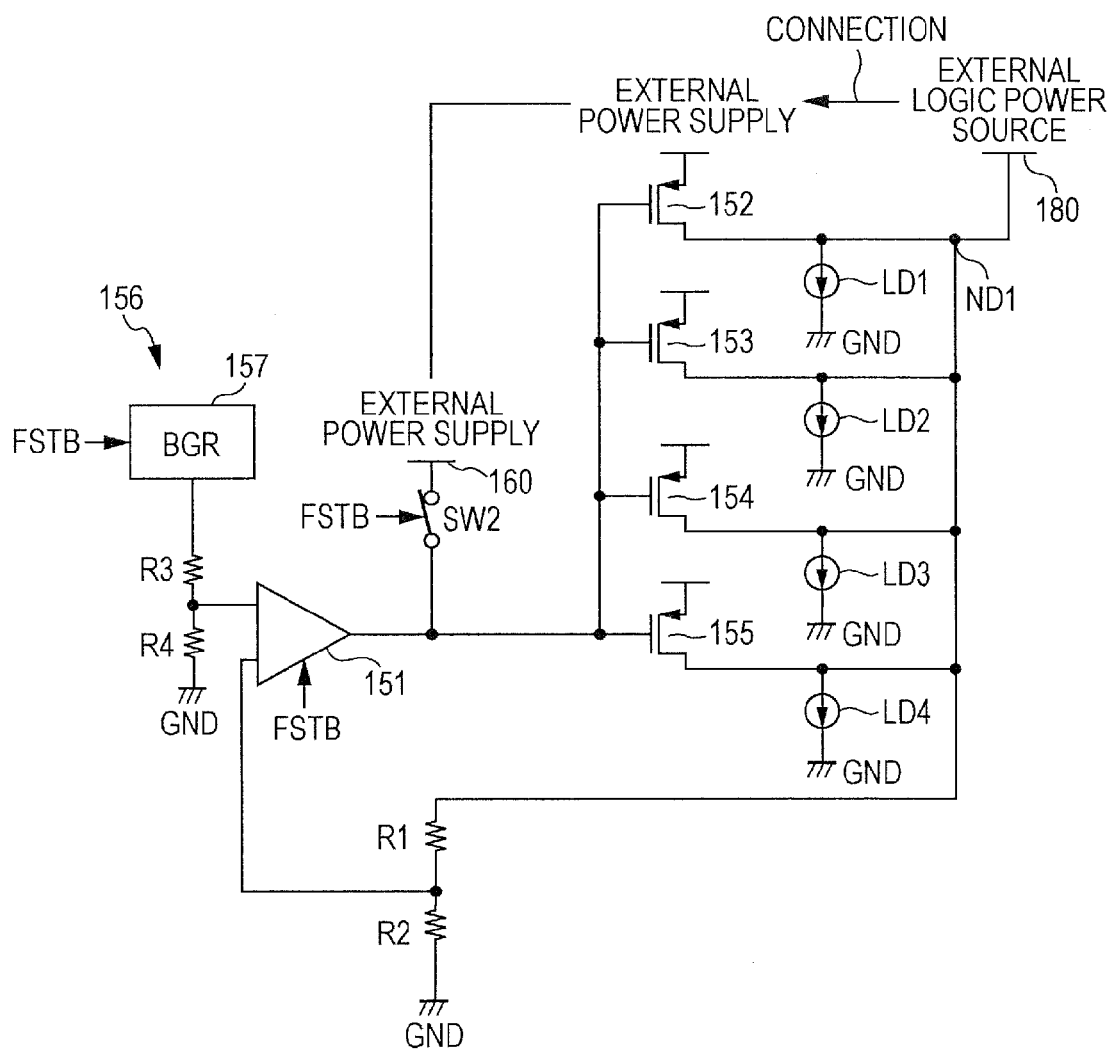
FIG. 9 is a diagram for further describing a forced standby function (forced standby mode) in a regulator according to an embodiment of the present technology.

FIG. 9 is a diagram for further describing a forced standby function (forced standby mode) with respect to a regulator according to the embodiment of the present technology.

The regulator 150B in FIG. 9 includes a switch SW2 as a circuit turning off (cut off) output stage transistors at the time of a forced standby mode operation.

The switch SW2 is connected between the external power supply 160 and an output of error amplifier 151, turned on with the receipt of a forced standby control signal FSTB, and cut off gates of output stage transistors 152 to 155 to be the external power voltage supply level.

When the forced standby mode is in operation, all the transistors in the error amplifier 151 are turned off. However, the power source side of output stage transistors 152 to 155 is set in a state of floating. As a result, the output stage transistors flow back to the power source through a body diode of the output stage transistors 152 to 155 of regulator 150B.

To avoid this, as illustrated in FIG. 9, the external power supply of regulator 150B and a logic power source 180 which supplies power to the regulator 150B are connected to each other, and then turns on the switch SW2. In this way, a source side of output stage transistors 152 to 155 and a drain side become the same potential, such that it may be avoidable to flow back to the power through the body diode.

As illustrated in FIG. 5 to FIG. 9, the regulator 150 (150A and 150B), with respect to customers who are capable of being supplied with the power voltage for logic, is connected on the substrate 170 from the output stage to the voltage divisional resistor.

Therefore, when the forced standby mode is in operation, it may be possible to supply the external power voltage directly from the substrate 170.

However, in the regulator 150, the power is operated to be floating, and then the current would flow back toward a power system through the body diode of output stage transistors.

Further, the regulator 150 performs a design to suppress the current consumption at the time of the standby mode.

When the standby mode is in operation, because all the transistors in the circuit are designed to be turned off, a standby current becomes an off-leakage current.

Because the output stage transistors 152 to 155 consume the biggest current in the regulator 150, the size of the output stage is determined in consideration of the leakage current.

Further, by disposing a divided output stage, a long-distance wiring occurs between the error amplifier 151 and the output stage. The RC capacity caused by this long-distance wiring deteriorates the stability of the regulator 150, such that the RC capacity may be lowered as much as possible.

Figure 10:
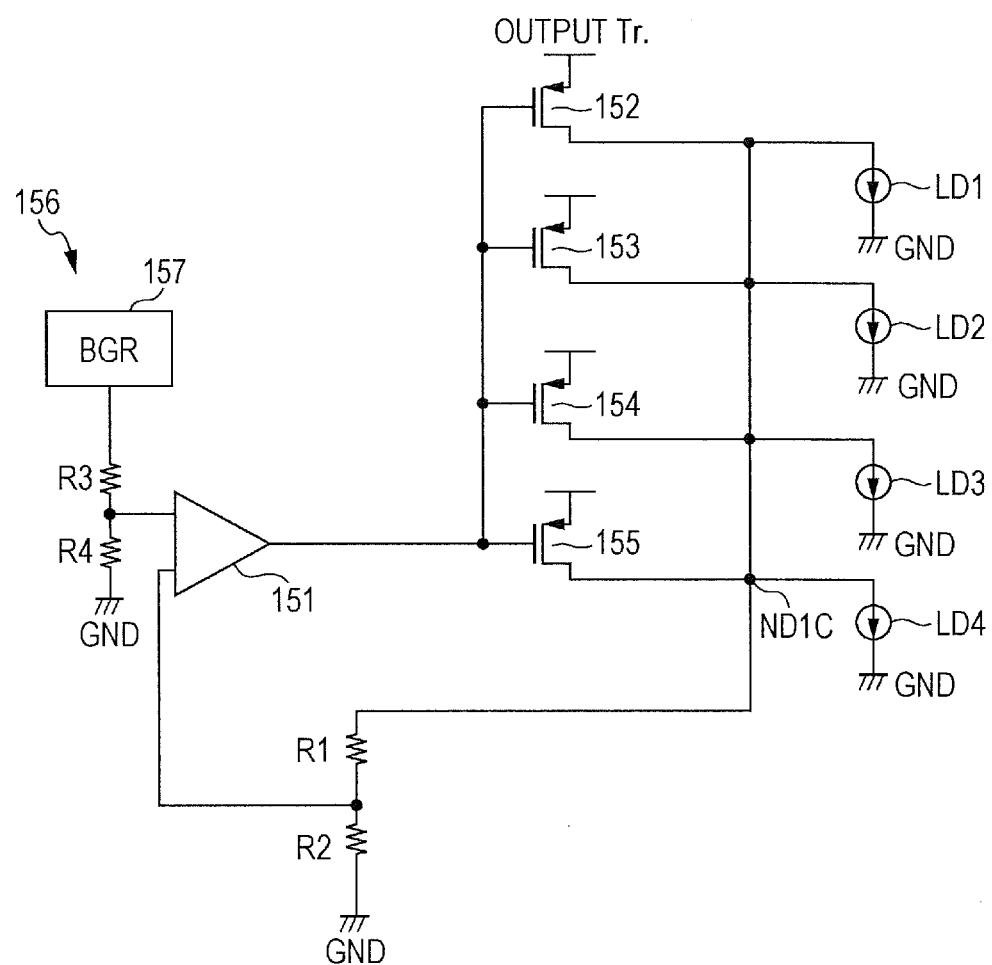
FIG. 10 is a circuit diagram illustrating another configuration example of an internal regulator according to an embodiment of the present technology.

FIG. 10 is a circuit diagram illustrating another example of configuration of an internal regulator according to the embodiment of the present technology.

The internal regulator 150C in FIG. 10 is basically different from the regulator 150 in FIG. 5 in that the outputs of the output transistors 152 to 155 are commonly connected at the previous stage which drives the load LD1 to LD4 and connected to a voltage resistor.

In this case, since there is no connection with a substrate, it may be difficult to respond in a case where the external power voltage for logic is capable of being supplied.

The other configurations are similar to the regulator 150 in FIG. 5, such that it is possible to obtain similar effects.

3. Summary of Solid-State Imaging Device

As an example of solid-state imaging device according to the embodiment of the present technology, an example of configuration of CMOS image sensor will be described.

3.1 Basic Configuration of Solid-State Imaging Device

Figure 11:
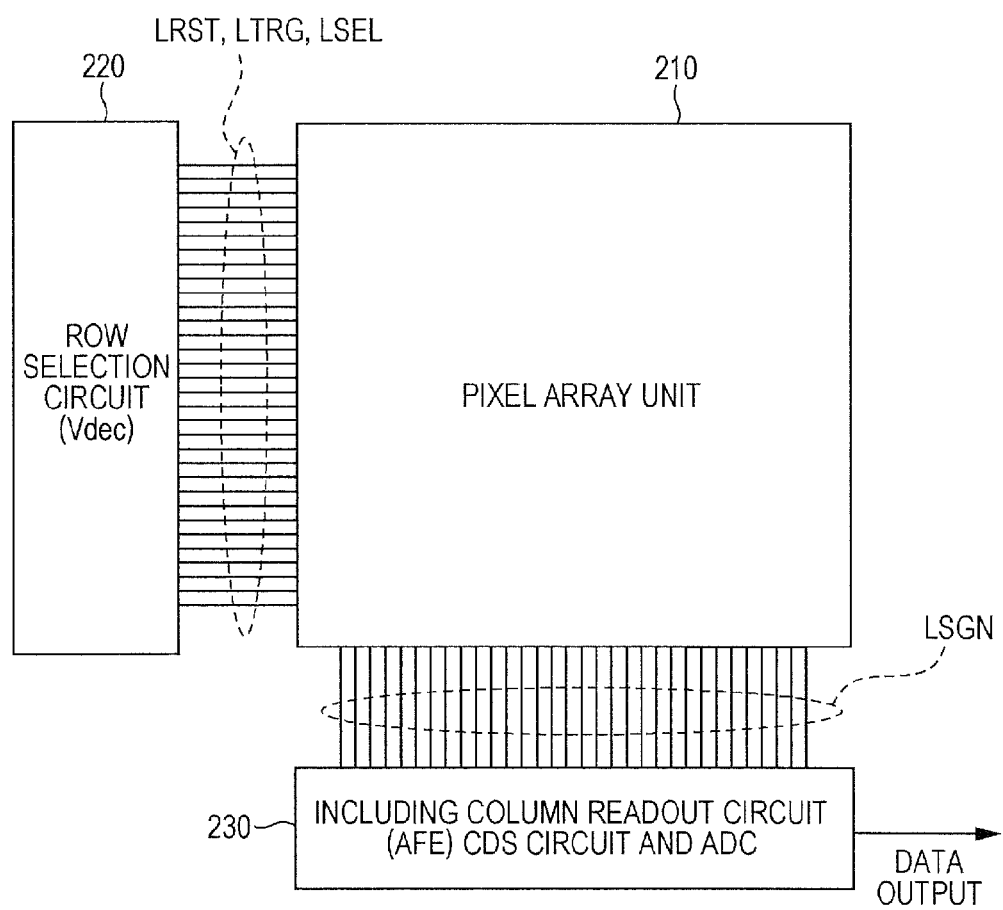
FIG. 11 is a diagram illustrating an example of basic configuration of CMOS image sensor (solid-state imaging device) according to an embodiment of the present technology.

FIG. 11 is a diagram illustrating an example of basic configuration of CMOS image sensor (solid-state imaging device) according to the embodiment of the present technology.

A CMOS image sensor 200 in FIG. 11 includes a pixel array 210, a row selection circuit (Vdec) 220, and a column readout circuit (AFE) 230.

Further, a pixel signal readout unit is formed by the row selection circuit 220 and the column readout circuit 230.

As a semiconductor apparatus, the CMOS image sensor 200 adopts a stacked structure in FIG. 3.

According to the embodiment of the present technology, with respect to the stacked structure, basically, the pixel array unit 210 is disposed in a first chip 110. Further, for example, a row selection circuit 220 which forms the pixel signal readout unit in a second chip 120, a column readout circuit 230, and a regulator 150 are disposed in the second chip 120.

A driving signal of pixel, an analog readout signal of pixel (sensor), a power voltage or the like is transferred between the first chip 110 and the second chip 120 through a TCV formed in the first chip 110.

In the pixel array unit 210, a plurality of pixel circuits 210A are disposed in a two dimensional form (matrix form) of M row×N column.

Figure 12:
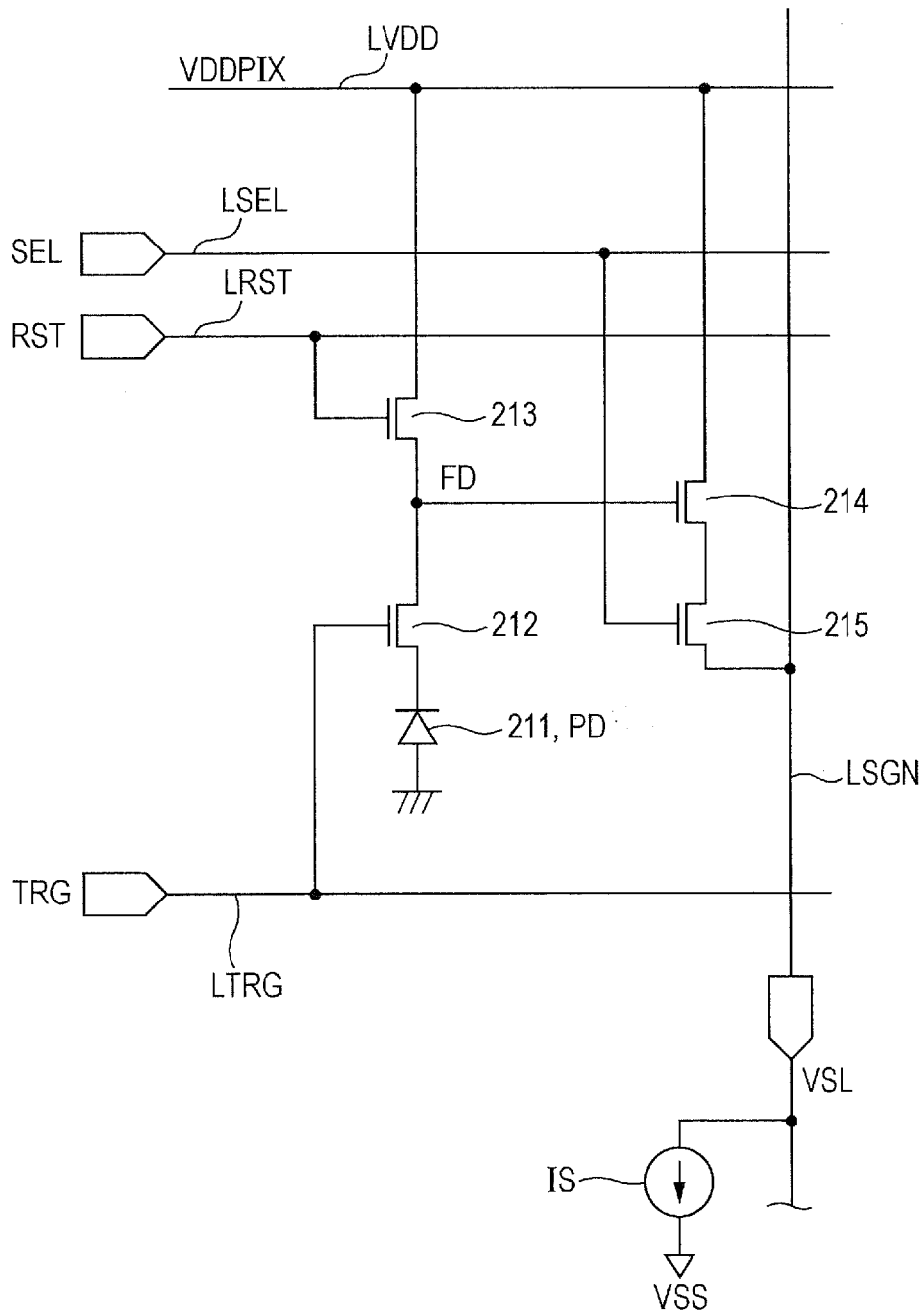
FIG. 12 is a diagram illustrating an example of a pixel of CMOS image sensor which is configured of four transistors according to an embodiment of the present technology.

FIG. 12 is a diagram illustrating an example of a pixel of CMOS image sensor formed of four transistors according to the embodiment of the present technology.

The pixel circuit 210A includes, for example, a photoelectric conversion element 211 (hereinafter, sometimes simply referred to as PD) formed of a photo-diode (PD).

With respect to this one photoelectric conversion element 211, the pixel circuit 210A has four transistors as active elements such as a transfer transistor 212, a reset transistor 213, amplification transistor 214, and a selection transistor 215.

The photoelectric conversion element 211 performs a photoelectric conversion of an incident light into an amount of charge (in this case, electrons) corresponding to an amount of light thereof.

The transfer transistor 212 as a transferring element is connected between the photoelectric conversion element 211 and the floating diffusion FD as an input node, and a transfer signal TRG which is a control signal is provided to a gate thereof (transfer gate) through a transfer control line LTRG.

In this way, photoelectric converted electrons at the photoelectric conversion element 211 are transferred to the floating diffusion FD by the transfer transistor 212.

A reset transistor 213 is connected between a power line LVDD to which a power voltage VDD is supplied and the floating diffusion FD, and a reset signal RST which is the control signal is provided to the gate thereof through a reset control line LRST.

In this way, the reset transistor 213 as a reset element resets the potential of floating diffusion FD to a potential of power line LVDD.

A gate of amplification transistor 214 is connected as an amplification element in the floating diffusion FD. That is, the floating diffusion FD functions as an input node of amplification transistor 214 as the amplification element.

The amplification transistor 214 and a selection transistor 215 are connected in serial between a power line LVDD to which the power voltage VDD is supplied and a signal line LSGN.

In this way, the amplification transistor 214 is connected to the signal line LSGN through the selection transistor 215, and configures a constant current source IS outside a pixel unit and a source follower.

Further, a selection signal SEL which is the control signal corresponding to an address signal is provided to the gate of selection transistor 215 through a selection control line LSEL, and the selection transistor 215 is turned on.

When the selection transistor 215 is turned on, the amplification transistor 214 amplifies the potential of the floating diffusion FD and outputs a voltage corresponding to the potential thereof to the signal line LSGN. Through the signal line LSGN, a voltage output from each pixel is output to column readout circuit 230.

The operation thereof is performed simultaneously with respect to each pixel of one line, for example, since each gate of the transfer transistor 212, the reset transistor 213, and the selection transistor 215 is connected in a line unit.

The reset control line LRST, the transfer control line LTRG, and the selection control line LSEL are wired in each line unit of pixel arrangement as a set.

Each control line of LRST, LTRG, LSEL are respectively provided each M at a time.

These control lines such as the reset control line LRST, the transfer control line LTRG, and the selection control line LSEL are driven by a row selection circuit 220.

The row selection circuit 220 controls the operation of pixel which is disposed in an arbitrary row line out of a pixel array unit 210. The row selection circuit 220 controls the pixel through the control lines LSEL, LRST, and LTRG.

The row selection circuit 220, for example, switches between a rolling shutter method which performs exposure for each row according to a shutter mode switching signal and a global shutter method which performs an exposure in a previous pixel motion, such that a pixel drive control is performed.

A column readout circuit 230 receives a pixel data of row line which has been readout-controlled by the row selection circuit 220 through the signal output line LSGN, and then the data is transferred to a signal processing circuit as a subsequent stage.

The column readout circuit 230 includes CDS circuit or ADC (analog digital converter).

3.2 Configuration Example of Solid-State Imaging Device Mounted with Column Parallel ADC Although not being limited to in particular, a CMOS image sensor according to the embodiment of the present technology, for example, may be configured as a CMOS image sensor which is mounted with a column-parallel type analog digital converting apparatus (hereinafter, referred to as ADC).

Figure 13:
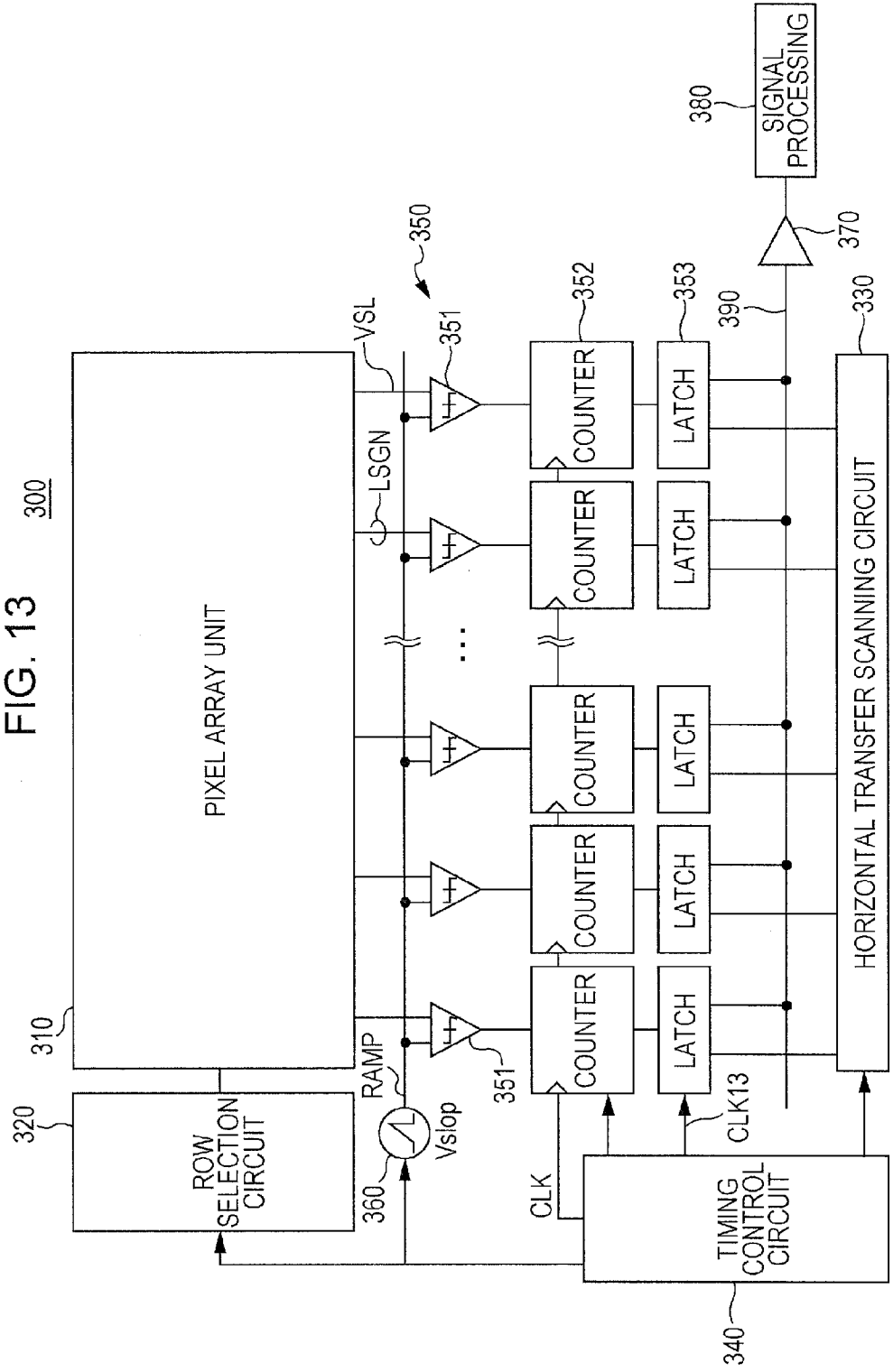
FIG. 13 is a block diagram illustrating a configuration example of CMOS image sensor (solid-state imaging device) mounted with a column-parallel ADC according to an embodiment of the present technology.

FIG. 13 is a block diagram illustrating a configuration example of CMOS image sensor (solid-state imaging device) mounted with a column-parallel ADC according to the embodiment of the present technology.

As illustrated in FIG. 13, the solid-state imaging device 300 includes a pixel array 310 as an imaging device, a column selection circuit 320 as a pixel drive unit, a horizontal transfer scanning circuit 330, and a timing control circuit 340.

Further, the solid-state imaging device 300 includes an ADC group 350, a digital analog converting apparatus as a ramp signal generator (hereinafter, referred to as DAC (Digital Analog Converter)) 360, an amplification circuit (S/A) 370, a signal processing circuit 380, and a horizontal transfer line 390.

The pixel array 310 includes a photoelectric conversion element (photo-diode) and an amplifier inside a pixel, for example, a pixel illustrated in FIG. 16 is configured to be disposed in a matrix form (form of a row and a column).

Further, in the solid-state imaging device 300, the next circuit is disposed as a control circuit in order to sequentially readout a signal of pixel array unit 310.

That is, in the solid-state imaging device 300, the timing control circuit 340 generating an internal clock as the control circuit, the row selection circuit 320 controlling a row address or a row scanning, and the horizontal transfer scanning circuit 330 controlling a column address and a column scanning are disposed.

In the ADC group 350, a single-slope type ADC having a comparator 351, a counter 352, and a latch 353 is arranged in plural columns.

The comparator 351 compares a reference voltage Vslop which is a ramp waveform (RAMP) which changes a reference voltage generated by DAC 360 into a staircase pattern with an analog signal obtained by way of a vertical signal line LSGN from a pixel for each row line.

The counter 352 counts a comparison time of the comparator 351.

The ADC group 350 is configured of the column-parallel ADC block which includes a function of n-bit digital signal conversion and is disposed for each vertical signal line (column line).

An output of each latch 353, for example, is connected to the horizontal transfer line 390 of 2n-bit width.

Further, 2n amplification circuits 370 corresponding to the horizontal transfer line 390 and a signal processing circuit 380 are disposed.

In the ADC group 350, the analog signal (potential VSL) which is read out to the vertical signal line LSGN is compared with the reference voltage Vslop at the comparator 351 which is disposed for each column (slope waveform varying in a linear having a certain tilt).

At this time, the potential of the vertical signal line (analog signal) VSL is converted into a digital signal in a state where the counter 352 which is disposed for each column the same as the comparator 351 operates while the voltage Vslop of ramp waveform RAMP and the value of counter take on a one-to-one correspondence.

A change of reference voltage Vslop is a change which converts the voltage into a change of time, which is converted into a digital value by counting the time for a given period (clock).

When the analog electric signal VSL and the reference voltage Vslop intersect, the output of the comparator 351 is inverted, the clock input of the counter 352 is stopped, and then the AD conversion is completed.

After the above conversion period is ended, by the horizontal transfer scanning circuit 330, the data stored in latch 353 is input to the signal processing circuit 380 by way of the horizontal transfer line 390 and the amplification circuit 370, and then a two-dimensional image is generated.

In this way, a column-parallel output processing is performed.

Further, the specific configuration of the comparator 351 which is adopted here will be mentioned in detail later.

Also, the stacked structure in FIG. 9 is adopted in the CMOS image sensor 300 as a semiconductor apparatus.

In the stacked structure according to the present technology, basically, the pixel array unit 310 and the comparator 351 of ADC group 350 are disposed in a first chip 110.

In the second chip 120, the row selection circuit 320, the horizontal transfer scanning circuit 330, the timing control circuit 340, the counter 352 of ADC group 350, the latch 353, the DAC 360, the amplification circuit 370, the signal processing circuit 380, the horizontal transfer line 390, the regulator 150 are disposed.

The driving signal of pixel, the analog readout signal of pixel (sensor) or the power voltage or the like is transferred and received between the first chip 110 and the second chip 120 through a TCV formed in the first chip 110.

As described above, according to the embodiment of the present technology, it may be possible to obtain following effect.

A regulator 150 according to the embodiment of the present technology is a low dropout voltage regulator (LDO) including one error amplifier, a plurality of output stage transistors, and a voltage divisional resistor.

The regulator 150 includes a configuration fed back to the error amplifier through a voltage divisional resistor that an output of error amplifier is connected to a plurality of output stage transistors and an output path of the output stage transistors is connected to a single node.

The regulator 150 is disposed in the second chip 120 where a logic circuit 140 is disposed.

In this way, by setting one error amplifier, there is also one feedback point, such that a plurality of error amplifiers perform more stable operation.

In a case where the regulator is mounted within the image sensor, a heat gradient is caused in a plane of chip in which the regulator is a heat source. However, in the embodiment of the present technology, the output stage is, for example, disposed in corners of the chip by being divided (dispersed). In this way, it may be possible to alleviate the heat gradient in a plane of the chip.

In a case where the regulator is mounted on the image sensor having the stacked structure bonded to each other by an upper-chip 110 and a lower-chip 120, there may be a problem in that a heat source may be generated directly under the pixel.

Since the output stage transistor is divided and disposed in the corners, dark shading caused by the heat gradient may be alleviated.

Further, a response to a customer who is not capable of being supplied with the power source for logic may be possible.

Further, an IR drop toward logic unit may be alleviated by the output stage being divided.

Since a sense line from the output stage transistors outputs a desired voltage in a state where a feedback is performed through the voltage divisional resistor, a voltage variation of output stage is corrected by the feedback configuration.

Further, the regulator includes a standby mode function.

The standby function turns off all the internal transistors, with the exception of GND level pull-down transistors, through a standby control signal, such that a reference current from BGR is cut. At this time, an output of regulator is set to the GND level.

Therefore, since all the transistors are turned off in the standby mode, low power consumption is possible. Since most off-leakage is caused by the output stage transistors, it may be possible to determine size of the output stage transistors in consideration of the off-leakage.

The regulator includes an output terminal and a function of a forced standby.

The forced standby function turns off the function of the regulator using a forced standby control signal and may supply an output terminal with a voltage for logic power source from outside.

Therefore, the external power may be supplied by turning off the regulator.

When a forced standby mode is in operation, a power source for logic which is supplied to the regulator is connected to an external power supply of regulator, and then the output transistors are turned off. In this way, the source side of output stage transistors 152 to 155 and a drain side thereof become the same potential, such that it may be possible to avoid a reverse current to the power supply through the body diode.

Further, in the embodiment of the present technology, the divided sense lines of the output stage transistor are disposed to be connected through a substrate, and feed back to an error amplifier. In this way, a low resistance value due to a substrate connection may be fed back.

The solid-state imaging device having such an effect may be applied an imaging device of a digital camera or a video camera.

4. Configuration Example of Camera System

Figure 14:
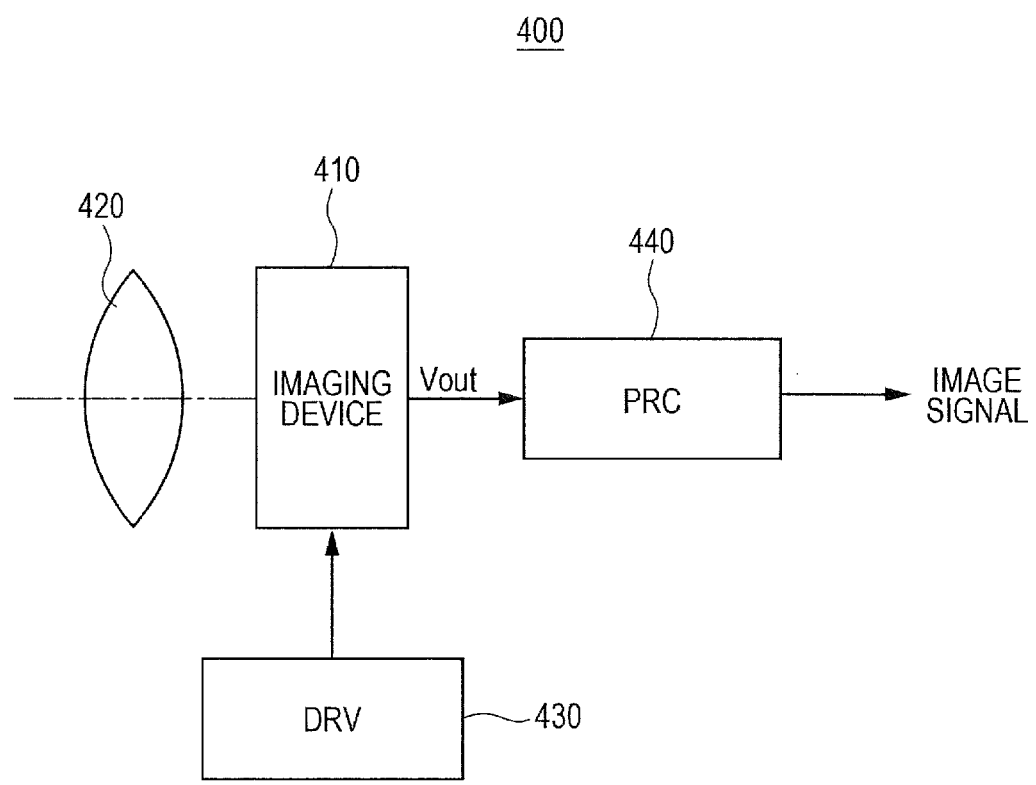
FIG. 14 is a diagram illustrating a configuration example of a camera system with a solid-state imaging device applied thereto according to the present technology.

FIG. 14 is a diagram illustrating an example of configuration of a camera system to which a solid-state imaging device according to an embodiment of the present technology function.

As illustrated in FIG. 14, the camera system 400 includes an imaging device 410 which the CMOS image sensor (solid-state imaging device) 100, 200, 300 according to the embodiment of the present technology may be applied.

Further, the camera system 400 includes an optical system guiding an incident light (imaging a subject image) to a pixel region of the imaging device 410, for example, a lens 420 imaging the incident light (image light) onto an imaging surface.

The camera system 400 includes a driving circuit (DRV) 430 which drives imaging device 410, a signal processing circuit (PRC) 440 which processes an output signal of imaging device 410.

The driving circuit 430 includes a timing generator (not illustrated) which generates various timing signals having a start pulse or a clock pulse which drives a circuit in the imaging device 410, and drives the imaging device 410 with a predetermined timing signal.

The signal processing circuit 440 performs a predetermined signal processing on the output signal of the imaging device 410.

An image signal which is processed at the signal processing circuit 440, for example, is recorded on a recording medium such as a memory. Image information which is recorded on the recording medium is hard-copied by printer or the like.

Further, the image signal which is processed at the signal processing circuit 440 is projected as a moving image onto a monitor formed of such as a liquid crystal display.

As mentioned above, in the imaging apparatus such as digital still camera, as an imaging device 410, since the aforementioned imaging devices 100, 200, 300 are mounted, a camera with low power consumption and high-precision may be realized.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a first circuit portion that includes a pixel array unit having a plurality of pixels for respective photoelectric conversion;
a second circuit portion that includes a pixel signal readout unit having a logic unit for readout of a pixel signal from the pixel array unit, and that includes
a regulator supplying a driving voltage to the logic unit;
the first and second circuit portions being arranged in a stacked structure wherein sections including the first circuit section and the second circuit section are bonded;
wherein the regulator includes
output stage transistors, and
an operational amplifier configured to compare a reference voltage and an output voltage of the output stage transistors,
wherein an output of the operational amplifier is connected to a gate of the output stage transistors, and outputs of the output stage transistors are connected to a given node to provide the output voltage at the given node,
wherein a power source side terminal of the output stage transistors is connected to a power supply terminal configured to receive an external power voltage, and
wherein the operational amplifier is configured to control the gate voltage of the output stage transistors by comparing the reference voltage and the output voltage.

2. The solid-state imaging device according to claim 1, wherein the output stage transistors are respectively disposed to be distributed in the second circuit portion.

3. The solid-state imaging device according to claim 2, wherein the output stage transistors are respectively disposed to be distributed in the corners of the second circuit portion.

4. The solid-state imaging device according to claim 2, wherein a sense line of the output stage transistors is connected via a substrate and fed back to the operational amplifier.

5. The solid-state imaging device according to claim 1, wherein the reference voltage generation unit includes a band gap unit supplying a constant current, and a reference voltage generation resistor generating the reference voltage by receiving a current caused by the band gap unit to supply the operational amplifier with the reference voltage.

6. The solid-state imaging device according to claim 5, wherein the regulator is configured to include a standby mode that turns internal transistors off, with the exception of transistors that fix the potential of output, and that cuts off a current from the band gap unit, using a standby control signal.

7. The solid-state imaging device according to claim 1, wherein the regulator is configured to include a forced standby mode that supplies an output terminal with an external power voltage for logic.

8. The solid-state imaging device according to claim 7, wherein the regulator includes a circuit configured to turn off the output stage transistors during the forced standby mode, and
wherein the regulator is configured to turn off all the transistors in the operational amplifier during the forced standby mode, and connect the external power supply and the logic power source to each other to set the power source side terminal of the output stage transistors and the output side terminal at the same potential.

9. A camera system comprising:
a solid-state imaging device; and
an optical system imaging an image of a subject to the solid-state imaging device,
wherein the solid-state imaging device includes:
a first circuit portion that includes a pixel array unit having a plurality of pixels for respective photoelectric conversion;
a second circuit portion that includes a pixel signal readout unit having a logic unit for readout of a pixel signal from the pixel array unit, and that includes
a regulator supplying a driving voltage to the logic unit;
the first and second circuit portions being arranged in a stacked structure wherein sections including the first circuit section and the second circuit section are bonded;
wherein the regulator includes
output stage transistors, and
an operational amplifier configured to compare a reference voltage and an output voltage of the output stage transistors,
wherein an output of the operational amplifier is connected to a gate of the output stage transistors, and outputs of the output stage transistors are connected to a given node to provide the output voltage at the given node,
wherein a power source side terminal of the output stage transistors is connected to a power supply terminal configured to receive an external power voltage, and
wherein the operational amplifier is configured to control the gate voltage of the output stage transistors by comparing the reference voltage and the output voltage.

10. The camera system according to claim 9,
wherein the output stage transistors are respectively disposed to be distributed in the second circuit portion.

11. The camera system according to claim 10,
wherein the output stage transistors are respectively disposed to be distributed in the corners of the second circuit portion.

12. The camera system according to claim 10,
wherein a sense line of the output stage transistors is connected via a substrate and fed back to the operational amplifier.

13. The camera system according to claim 9,
wherein the reference voltage generation unit includes a band gap unit supplying a constant current, and
a reference voltage generation resistor generating the reference voltage by receiving a current caused by the band gap unit to supply the operational amplifier with the reference voltage.

14. The camera system according to claim 13,
wherein the regulator is configured to include a standby mode that turns internal transistors off, with the exception of transistors that fix the potential of output, and that cuts off a current from the band gap unit, using a standby control signal.

15. The camera system according to claim 9,
wherein the regulator is configured to include a forced standby mode that supplies an output terminal with an external power voltage for logic.

16. The camera system according to claim 15,
wherein the regulator includes a circuit configured to turn off the output stage transistors during the forced standby mode, and
wherein the regulator is configured to turn off all the transistors in the operational amplifier during the forced standby mode, and connect the external power supply and the logic power source to each other to set the power source side terminal of the output stage transistors and the output side terminal at the same potential.

* * * * *